(12) United States Patent
Åström et al.

(10) Patent No.: US 9,872,169 B2
(45) Date of Patent: Jan. 16, 2018

(54) OPERATING A DATA BACK END NODE IN A DATA LAYERED ARCHITECTURE NETWORK

(75) Inventors: Bo Åström, Stockholm (SE); Jan Lemark, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/427,932

(22) PCT Filed: Sep. 14, 2012

(86) PCT No.: PCT/EP2012/068119
§ 371 (c)(1),
(2), (4) Date: Mar. 12, 2015

(87) PCT Pub. No.: WO2014/040638
PCT Pub. Date: Mar. 20, 2014

(65) Prior Publication Data
US 2015/0373532 A1    Dec. 24, 2015

(51) Int. Cl.
*H04W 8/12* (2009.01)
*H04W 8/18* (2009.01)
(Continued)

(52) U.S. Cl.
CPC ............ *H04W 8/186* (2013.01); *H04W 8/20* (2013.01); *H04W 8/30* (2013.01)

(58) Field of Classification Search
CPC ...................................................... H04W 8/26
(Continued)

(56) References Cited

U.S. PATENT DOCUMENTS

| 5,953,662 A | * | 9/1999 | Lindquist | H04W 24/02 455/433 |
| 6,097,942 A | * | 8/2000 | Laiho | H04W 4/08 455/414.1 |

(Continued)

FOREIGN PATENT DOCUMENTS

| WO | 2008/122650 A2 | 10/2008 |
| WO | 2009/008582 A1 | 1/2009 |

OTHER PUBLICATIONS

"Universal Mobile Telecommunications System (UMTS); LTE; User Data Convergence (UDC); Technical realization and information flows; Stage 2, 3GPP TS 23.335 V10.0.0, Release 10," Apr. 1, 2011, Technical Specification, European Telecommunications Standards Institute (ETSI), 650, Route des Lucioles; F-06921 Sophia-Antipolis; France.

(Continued)

*Primary Examiner* — Vladimir Magloire
*Assistant Examiner* — Majid Syed

(57) ABSTRACT

A method and apparatus for operating a data back end node in a data layered architecture network. A database of subscriber data is maintained at a database such that the data is organized into at least one data group. The data associated with each subscriber is associated with a data group. A virtual Home Location Register identifier is assigned to the data group. At least a part of the subscriber data and the virtual HLR identifier is sent to an HLR front end node. In the event of a reset by a Core Network node, only subscriber data associated with the identified data group will need to be rebuilt.

9 Claims, 3 Drawing Sheets

(51) Int. Cl.
 *H04W 8/30* (2009.01)
 *H04W 8/20* (2009.01)
(58) Field of Classification Search
 USPC .......................................................... 455/433
 See application file for complete search history.

(56) References Cited

U.S. PATENT DOCUMENTS

| | | | | |
|---|---|---|---|---|
| 6,658,259 | B2* | 12/2003 | McIntosh | H04W 8/04 455/433 |
| 8,230,063 | B2* | 7/2012 | Shi | H04L 67/1065 370/254 |
| 8,452,325 | B2* | 5/2013 | McCann | H04W 8/28 455/551 |
| 2005/0081095 | A1* | 4/2005 | Wang | H04W 24/04 714/13 |
| 2005/0119017 | A1* | 6/2005 | Lovell | H04W 8/12 455/466 |
| 2014/0378130 | A1* | 12/2014 | Mantynen | H04W 8/02 455/433 |

OTHER PUBLICATIONS

Nokia Siemens Networks, et al., "Pseudo-CR on FE identity," Aug. 2009, 3GPP Draft; C4-092234, 3rd Generation Partnership Project, Mobile Competence Centre; 650, Route des Lucioles; F-06921 Sophia-Antipolis; France.

ZTE: "Pseudo-CR on Clarification on some definitions," Aug. 24, 2009, 3GPP Draft; C4-092176 (Clarification on Definitions), 3rd Generation Partnership Project, Mobile Competence Centre; 650, Route des Lucioles; F-06921 Sophia-Antipolis; France.

Alcatel-Lucent: "Pseudo-CR on Routing with multiple UDRs," Aug. 13, 2010, 3GPP Draft; C4-102211 UDC Evol Routing With Multiple UDRs, 3rd Generation Partnership Project, Mobile Competence Centre; 650, Route des Lucioles; F-06921 Sophia-Antipolis; France.

* cited by examiner

OPERATING A DATA BACK END NODE IN A DATA LAYERED ARCHITECTURE NETWORK

This application is a 371 of PCT/EP2012/068119, filed Sep. 14, 2012, the disclosure of which is fully incorporated herein by reference.

TECHNICAL FIELD

The present invention relates to operating a Data Back End node in a Data Layered Architecture network, and in particular to operating a Data Back-End node that provides data to a Home Location Register.

BACKGROUND

Current Public Land Mobile Networks (PLMN) typically comprise a radio access network and a core network. The radio access network is responsible for providing wireless access to network users, whilst the core network is responsible, inter alia, for subscriber service access control and subscriber roaming. In the case of 2G or GSM network, a typical PLMN comprises circuit switched (CS) core network for handling voice calls and a packet switched (PS) core network for handling data. A 3G or UMTS network similarly comprises PS and CS core networks, whilst a 4G or LTE network comprises only an Enhanced Packet Core (EPC) core network. In addition, service networks may co-exist with the PS and CS core networks. One such service network is the IP Multimedia Subsystem (IMS) network. The IMS network may also be considered as a core network. In practical implementations, subscribers may roam between different radio access networks, and services may be switched between core networks, e.g. a voice call may be switched from a 3G radio access network and CS core network to a 4G network, with the same IMS core network remaining in control of the session.

PLMN operators are always keen to reduce network signalling load for a given subscriber volume, to increase network resilience to failure, and to reduce the complexity and number of specialist network nodes. With this in mind, the 3GPP organisation has defined a so-called Data Layered Architecture (DLA) that splits the traditional node and network architecture introduced for networks such as GSM, UMTS and EPC in two halves; an application front end (Application-FE) that provides the logic for a node, and a Data back end (Data-BE) that provides data. This is illustrated in FIG. 1. The Data-BE provides a highly available and geo-redundant solution to the Application-FEs that simplifies the design of applications. DLA also simplifies the routing in the core networks since any node can, if it is built as a stateless FE, serve any subscriber. The principles and advantages of DLA can be summarised as follows:

Simplified routing to Application FEs in Core Networks
  Any Application FE can serve any subscriber
Data & Repository Consolidation
  Several applications use the same backend (repository consolidation)
  Data de-duplication by allowing several applications to access the same data object (data consolidation)
Scalable and Highly Available system
  Backend provides HA and Geo Redundancy
Simple scaling of Application Front Ends
Simplified Application Design
  Provisioning into back end database
  Dynamic allocation of subscribers to Application FEs
  Allows for stateless Application FE design
  Data Availability provided by the Backend Consider the Home Location Register (HLR) that is implemented in 2G and 3G core networks and that acts as a central database for subscriber information. The HLR stores details of subscriptions issued by the network operator. Typically, a network will comprise a number of HLRs, each of which is assigned to a group of network subscribers. An HLR provides subscriber information to other core network nodes, such as the 2G Mobile Switching Centre (MSC). In the traditional architecture, core network applications, such as the MSC, must identify and route signalling to the correct HLR (i.e. the HLR currently serving a given subscriber). According to the DLA architecture, an HLR-FE can serve any subscriber (i.e. all network subscribers) and network routing becomes very simple: the advanced Data-BE performs routing for the applications.

Other advantages of DLA include Data and Repository Consolidation allowing databases and data-object sharing, and simplified provisioning (and removal) of subscribers within the system.

While the Data-BE is designed to provide a highly available, resilient and redundant service to the Application-FEs, extreme failure conditions may occur. A Data-BE is partitioned into groups of subscribers that are divided between the nodes that constitute the entire Data-BE. These groups are referred to herein as Data Groups (DGs). Each DG is replicated between different Data-BE nodes for redundancy. If a first Data-BE node where the master version of a particular DG resides becomes unavailable, another Data-BE nodes takes over from the first Data-BE node using a synchronized, up-to-date copy of the DG.

In some circumstance, the entire DG might become unavailable. In this case, both the master and slave versions of the DG at all Data-BE nodes holding a copy of the DG are unavailable. During recovery from these extreme circumstances, the information for the subscribers belonging to the affected DG must be recreated.

Subscriber data includes substantially static subscriber data and dynamic subscriber data. Static subscriber data includes data that is never or rarely updated, for example, contact details, address details and so on. Dynamic subscriber data includes data that is more frequently updated, such as subscriber location, communication sessions a subscriber is involved in, whether the subscriber has set a call forwarding rule and so on.

In known, monolithic HLR systems, loss of availability of subscriber data requires sending Reset messages to all Core Network nodes in order to recreate the data. This is particularly important for recreating the dynamic subscriber data. Each subscriber is assigned to an HLR, which has an identifier known as an HLR-No. A receiving Core Network node (e.g. an MSC/VLR or Serving GPRS Support Node, SGSN) identifies the affected subscriber by the HLR-No, and remove the associated records. Removal of the associated records forces a location update for each removed subscriber served by the HLR identified by HLR-No, and data that was lost is gradually built up again.

However, the above solution to loss of HLR is not practical in a DLA network. In a DLA network, all subscribers are served by one "virtual" HLR, consisting of stateless HLR-FEs, with one common HLR-No for the entire system. A Reset using HLR-No for all HLR-Fes would remove every subscriber in the entire network, which would lead to a loss of data and a very large increase in signalling to gradually build up the data once more.

The MAP specification (3GPP 29.002) allows a list of HLR-Ids to be sent from the HLR to a CN node together with the HLR-No, where the HLR-Id includes "the leading digits of IMSI" (for example MCC+MNC+MSIN). This allows a number series to be removed in a core network node. This could be modified to reset subscribers in core network nodes if each DG in a Data-BE is assigned subscribers on a per number series basis. However, this is also undesirable as the provision of subscriber data does not naturally lend itself to an ordered sequence of numbers, as this would reduce flexibility in how operators can assign subscribers to different DGs.

SUMMARY

It is an object of the invention to ensure that, where a Data Group to which a subscriber belongs becomes unavailable in a data layered architecture network, data relating to the subscriber and all other subscribers belonging to the Data Group can be recreated without needing to recreate data for all subscribers connected to the network.

According to a first aspect, there is provided a method of operating a data back end (Data-BE) node for use in a data layered architecture (DLA) network. A database of subscriber data is maintained at a database such that it is organized into at least one data group. The data associated with each subscriber is associated with a data group. A virtual Home Location Register (HLR) identifier is assigned to the data group. At least a part of the subscriber data and the virtual HLR identifier is sent to an HLR front end (HLR-FE) node.

The advantage of this is that in a DLA network, there is no need to assign an HLR identifier that identifies a monolithic HLR to each subscriber, and so this field is effectively redundant. By re-using an HLR identifier to instead identify a data group, in the event of a system failure and requirement to rebuild subscriber data, only the data for subscribers associated with a particular data group identified by a virtual HLR identifier are affected; subscribers belonging to different data groups associated with different virtual HLR identifiers are unaffected and there is no need to rebuild their subscriber data.

As an option, the virtual HLR identifier is a HLR-No. This ensures a minimum impact on signalling.

The method optionally comprises maintaining a database of subscriber data comprising a plurality of data groups, each data group of the plurality of data groups being assigned a unique virtual HLR identifier.

As an option, at least a portion of the data stored in the data group is sent to a further Data-BE node for back-up by the further Data-BE node.

According to a second aspect, there is provided a Data-BE node for use in a DLA network. The Data-BE node is provided with a database of subscriber data. The database is organized such that it comprises at least one data group, and data associated with each subscriber is associated with a data group. A processor is provided for assigning a virtual HLR identifier to the data group. A transmitter is also provided for sending at least a part of the subscriber data and the virtual HLR identifier to a HLR-FE node.

As described above, in a DLA network, there is no need to assign an HLR identifier that identifies a monolithic HLR to each subscriber, and so this field is effectively redundant. The HLR identifier is therefore available for use to instead identify a data group. If the Data-BE fails, a CN node will be able to use the virtual HLR identifier to rebuild the subscriber data only for subscribers belonging to a particular group, rather than all subscribers to the network.

The processor is optionally arranged to assign a HLR-No to each data group. This ensures that the new identifier requires very few changes to existing signalling protocols.

As an option, the database stores a plurality of data groups, each data group of the plurality of data groups being assigned a unique virtual HLR identifier.

The Data-BE node is optionally provided with a second transmitter (7) for sending at least a portion of the data stored in the data group towards a further Data-BE node for back-up by the further Data-BE node.

According to a third aspect, there is provided an HLR-FE node for use in a DLA network. The HLR-FE node is provided with a receiver for receiving from a Data-BE node a message comprising subscriber information and a virtual HLR identifier associated with a Data Group to which the subscriber data belongs. The Data Group is a grouping of subscriber data at the Data-BE node. A transmitter is also provided for sending a message towards a Core Network node, the message including the virtual HLR identifier.

This allows a CN node to initiate a Reset only for subscribers belonging to an affected data group that is identified by the virtual HLR identifier, rather than for all subscribers to a DLA network. This greatly reduces the amount of signalling required for a Reset, and prevents unaffected subscribers from having their data removed and rebuilt.

In an advantageous option, the virtual HLR identifier is a HLR-No. This allows existing signalling protocols to be used with minimum impact on the signalling.

The transmitter for sending a message towards a Core Network node is optionally arranged to send the message towards any of a Mobile Switching Centre, a Visitor Location Register, a Serving GPRS Support Node and a Mobility Management Entity. These are provided by way of example only, and the message may be sent to any Core Network node that may need to perform a Reset.

According to a fourth aspect, there is provided a computer program comprising computer readable code which, when run on a Data-BE node in a DLA communications network, causes the Data-BE node to perform the method as described above in the first aspect.

According to a fifth aspect, there is provided a computer program, comprising computer readable code which, when run on a HLR-FE node in a DLA communications network, causes the HLR-FE node to behave as a HLR-FE node as described above in the second aspect.

According to a sixth aspect, there is provided a computer program product comprising a computer readable medium and a computer program as described above in either of the fourth or fifth aspects.

DETAILED DESCRIPTION

Figure 1:
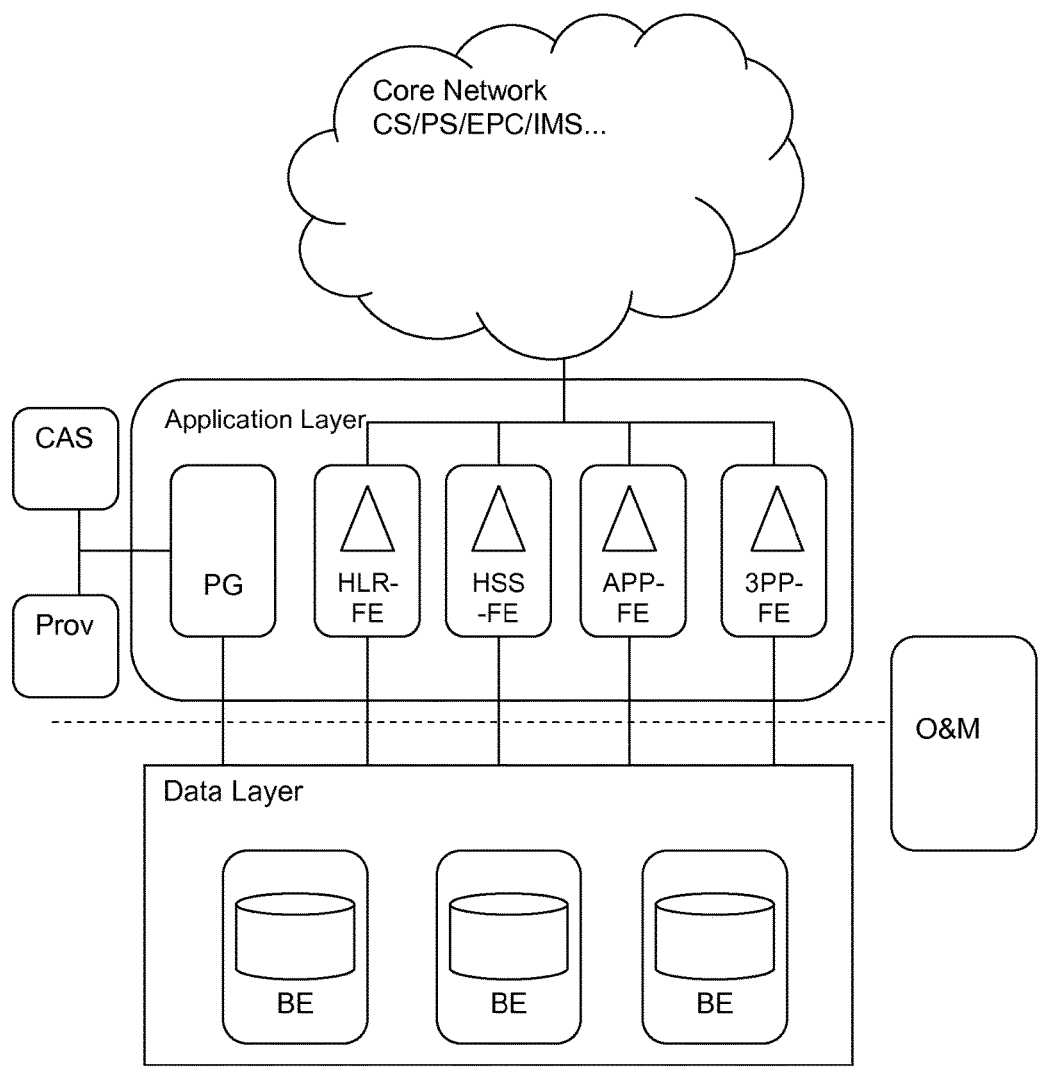
FIG. 1 illustrates schematically in a block diagram an exemplary Data Layered Architecture network.

DLA has been outlined above with reference to FIG. 1. An approach will now be described that allows data to be recreated only for subscribers belonging to an unavailable DG, rather than requiring that data for all network subscribers is recreated.

An HLR contains details of all subscribers authorised to use the Core Network, including details of services that each subscriber may access, subscriber location, call forwarding settings for each subscriber and so on. Furthermore, the HLR processes MAP transactions such as location updates. An HLR identifier (HLR-No) is used to route signalling to the HLR that stores data for one particular subscriber in a traditional monolithic HLR solution. In a DLA network, the HLR function is split between an HLR-FE which applies the HLR logic, and a Data-BE which provides the subscriber data. In this case, all subscribers to a network are served by a pool of HLR-FEs having a common HLR-No for the entire system.

Figure 2:
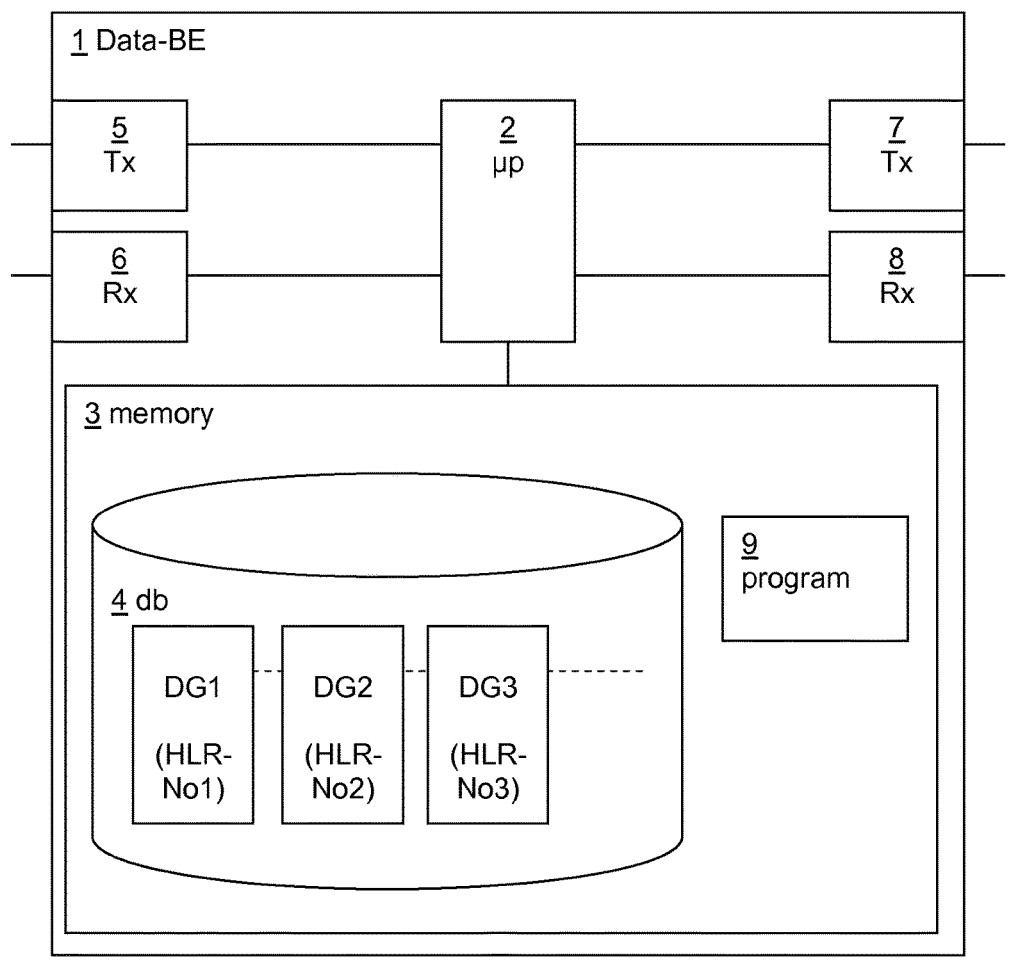
FIG. 2 illustrates schematically in a block diagram an exemplary a Data Back End node according to an embodiment.

FIG. 2 illustrates schematically a Data-BE end node 1. The Date-BE node 1 is provided with a processor 2 and a computer readable medium in the form of a memory 3. The memory 3 is used to store a database 4 that stores subscriber data (both static and dynamic). Data for each subscriber is assigned to a Data Group (DG1, DG2, DG3 etc. in FIG. 2).

During normal operation, subscriber data is sent to an HLR-FE using a first transmitter 5 and any updates to the subscriber data are received from the HLR-FE using a first receiver 6. The subscriber data in the relevant DG to which the subscriber belongs is then updated.

Furthermore, changes to subscriber data are communicated to a further Data-BE node via a second transmitter 7 in order to provide redundancy in case the Data-BE node 1 fails. A second receiver 8 may also be provided for receiving back-up data from a further Data-BE node so that the Data-BE node 1 can act as a slave to back-up data stored as a master copy at the further Date-BE node.

While separate transmitters and receivers are described above, it will be appreciated that these may be physically embodied in a single transmitter and a single receiver, or in a single transceiver.

The processor 2 allocates each DG with a virtual HLR identifier in the form of a virtual HLR-No. In the example of FIG. 2, DG1 is allocated HLR-No1, DG2 is allocated HLR-No2 and DG3 is allocated HLR-No3. The HLR-No allocated to each DG does not identify a physical HLR, as the HLR resides in a DLA network and the HLR-FE can serve any subscriber. However, the virtual HLR-No associated with each DG can be used for Reset signalling in the event that a DG and backups in other nodes are lost owing to a failure of one or more Data-BE nodes or the connectivity to the Data-BE nodes. It will be appreciated that the DG may be allocated a virtual HLR-No by another network node. The virtual HLR-No does not identify an HLR, but a DG. It is termed a "virtual" HLR-No herein because in a DLA network, the HLR-No becomes redundant and so can be re-used as a virtual HLR-No to identify a DG. This allows a DG to be identified in signalling without requiring changes to existing signalling protocols.

Each time an HLR-FE node obtains subscriber data from the Data-BE node 1 for MAP traffic processing, the virtual HLR-No associated with the DG to which the subscriber belongs is sent together with the subscriber data. The virtual HLR-No, in accordance with standard procedures, is sent o a core network node such as a MSC/VLR, SGSN or Mobility Management Entity (MME) as part of the normal location update procedure.

The Data-BE node 1 may also be provided with a computer program 9 stored in the memory 3. When executed by the processor 2, the computer program 9 causes the Data-BE node 1 to behave as described herein. While the above description assumes that the memory 3 is used to store the database 4 and the computer program 9, it will be appreciated that more than one physical embodiment of a memory may be provided.

Storing the virtual HLR-No with the subscriber data ensures that other subsequent MAP signalling procedures use the same virtual HLR-No for a particular subscriber.

In the event that the Data-BE fails and the HLR-FE cannot obtain subscriber data for any subscribers belonging to a particular DG, a Reset message is sent towards the Core Network nodes. However, because the DG is associated with a virtual HLR-No, and the Reset includes the virtual HLR-No, only subscribers belonging to the DG are affected by the Reset message.

Subscribers belonging to an unaffected DG are not affected by the Reset message. This ensures that unaffected subscribers do not suffer from data loss, and no unnecessary signalling as part of the Reset process is sent.

An advantage of using a virtual HLR-No to identify a DG is that no changes need be made to the Core Network nodes. They behave exactly as they would in the event that a Reset is required for a monolithic HLR in a non-DLA network. However, it will be appreciated that another type of identifier could be used to identify a DG. This may have the disadvantage of requiring that the Core Network nodes need to change the way they operate in order to perform a reset.

Figure 3:
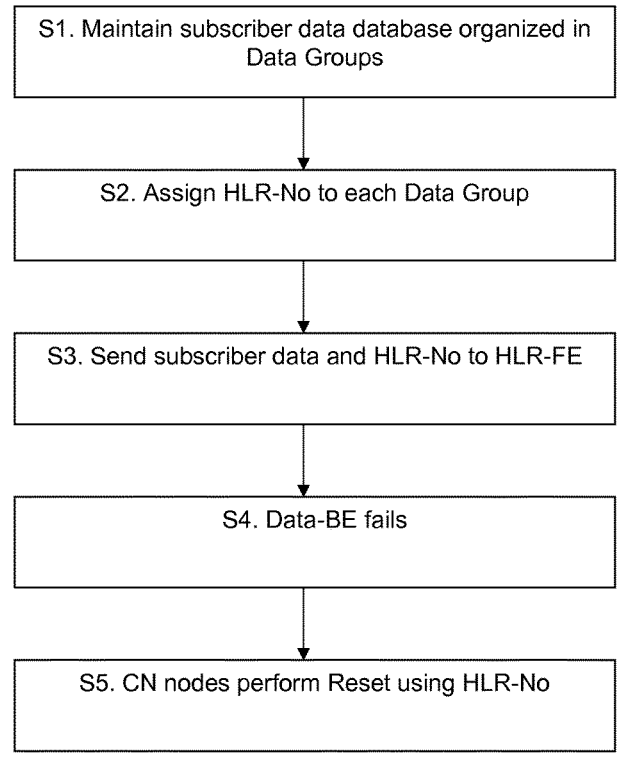
FIG. 3 is a flow diagram illustrating steps of an embodiment.

Referring now to FIG. 3, a flow diagram illustrating exemplary steps is shown. The following numbering corresponds to that of FIG. 3.

S1. The Data-BE 1 maintains a database 4 of subscriber data. Each subscriber is allocated a DG (for example, DG1). The database includes at least one DG, and may also include back-up DGs that are stored as master copies in other Data-BE nodes.

S2. Each DG is assigned a virtual HLR-No. As there is no need to use a standard HLR-No in a DLA network, the virtual HLR-No can replace the standard HLR-No in MAP signalling.

S3. Subscriber data (or a portion of subscriber data) is sent to the HLR-FE, along with the corresponding virtual HLR-No (HLR-No1 for DG1). The HLR-FE includes the virtual HLR-No in signalling towards Core Network nodes such as an MSC/VLR or SGSN.

S4. The Data-BE fails, along with the backups. This may be caused, for example, by failure of the Data-BE nodes or by failure of the connection to the Data-BE node 1 and the other Data-BE nodes that store back-up copies of the DG. In any case, the HLR-FE can no longer obtain the subscriber data for any subscriber belonging to DG1.

S5. A CN node performs a Reset operation using the virtual HLR-No (HLR-No1 for DG1, received in the MAP Reset from the HLR-FE). All subscribers belonging to DG1 are therefore cleared from the network, allowing subscriber data for all subscribers belonging to DG1 to be rebuilt. However, as the Reset operation is associated with the relevant virtual HLR-No, only the subscribers belonging to the DG associated with the virtual HLR-No are cleared and have their data rebuilt.

Figure 4:
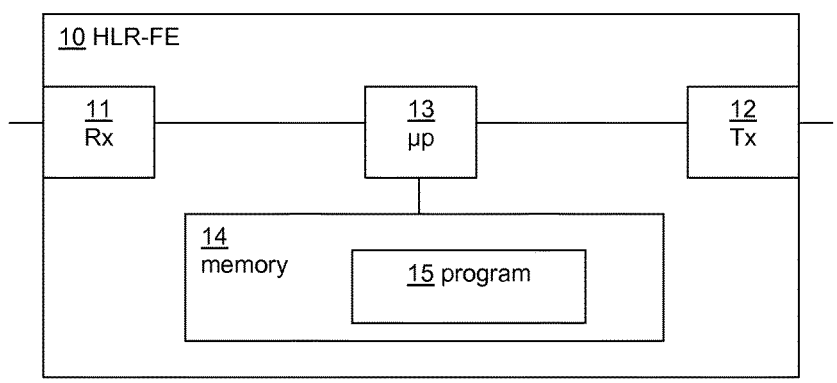
FIG. 4 illustrates schematically in a block diagram an exemplary a Home Location Register front end node.

Turning now to FIG. 4, there is illustrated schematically in a block diagram an HLR-FE 10. The HLR-FE 10 is provided with a receiver 11 for receiving from a Data-BE node subscriber data and an associated virtual HLR-No, that identifies the DG to which the subscriber belongs. A transmitter 12 is also provided for sending the virtual HLR-No and at least a potion of the subscriber data towards a Core Network node. In the event of a failure of the Data-BE node 1 and the unavailability of the subscriber data, the Core Network node can then use the virtual HLR-No to perform a Reset and only remove and rebuild subscriber data for those subscribers belonging to the DG associated with the virtual HLR-No, and not for all subscribers in the network.

The HLR-FE 10 is also provided with a processor 13 for handling the received and sent messages. A computer readable medium in the form of a memory 14 may also be provided. This may be used to store a computer program 15 which, when executed by the processor 13, causes the HLR-FE 10 to behave as described above.

As described above, in a non-DLA network with a monolithic HLR, the HLR-No is used to route signalling to he HLR serving a particular subscriber. This is not required in a DLA network because all HLR-FEs are stateless and can serve any subscriber. This allows the HLR-No to be replaced by the virtual HLR-No described above to identify a DG to which a subscriber belongs, rather than a monolithic HLR. The routing using virtual HLR-Nos follows the same round robin principles to any of the available HLR-FEs, in the same way as it is already done in layered solutions. All the virtual HLR-Nos would give the same routing analysis result. In this way, routing is unaffected by using the virtual HLR-No to identify a DG.

The invention enables a Reset procedure for DG partitions used in a layered data solution, where subscribers can be freely allocated to the partitions.

It will be appreciated by the person of skill in the art that various modifications may be made to the above described embodiment without departing from the scope of the present invention. For example, the functions of the various nodes are described as being embodied at a single node, but it will be appreciated that different functions may be provided at different network nodes.

The following abbreviations have been used in this application:
BE Back end
CN Core Network
CS circuit switched
DG Data Group
DLA Data Layered Architecture
EPC Evolved Packet Core
FE Front end
GRPS General Packet Radio Service
HLR Home Location Register
IMS IP Multimedia Subsystem
LTE Long Term Evolution
MAP Mobile Application Part
MCC Mobile Country Code
MME Mobility Management Entity
MSC Mobile Switching Centre
MNC Mobile Network Code
O&M Operations and Maintenance centre
PLMN Public Land Mobile Network
PS packet switched
SGSN Serving GPRS Support Node
SIM Subscriber Identity Module
VLR Visitor Location Register

The invention claimed is:

1. A method of operating a data back end node for use in a data layered architecture network, the method comprising:
    maintaining a database of subscriber data, the database being organized such that it comprises a plurality of data groups, each of the data groups being associated in the database with subscriber data of a plurality of subscribers in the network;
    assigning a virtual Home Location Register identifier to each data group; and
    sending at least a part of the subscriber data and the virtual Home Location Register identifier to a Home Location Register front end node; and
    in response to a data back end failure occurring in the data back end node or in connectivity to the back end node, receiving a reset message from the Home Location Register front end node at a core network node, the reset message including an indication of one of the virtual Home Location Register identifiers, whereby subscriber data corresponding to only a single data group identified by the virtual Home Location Register identifier is identified as needing to be reset by the core network node.

2. The method according to claim 1, wherein the virtual Home Location Register identifier is a Home Location Register-No.

3. The method according to claim 1, wherein each data group of the plurality of data groups is assigned a unique virtual Home Location Register identifier.

4. A non-transitory computer readable medium containing computer readable code which, when run on a data back end node in a data layered architecture communications network, causes the data back end node to perform the method of claim 1.

5. The method according to claim 1, further comprising sending at least a portion of the data stored in each data group to a further data back end node for back-up by the further data back end node.

6. A system for use in a data layered architecture network, the system comprising:
    a data back end node, the data back end node including:
    a database of subscriber data, the database being organized such that it comprises a plurality of data groups, each of the data groups being associated in the database with subscriber data of a plurality of subscribers in the network;
    a processor for assigning a virtual Home Location Register identifier to each data group; and a first transmitter for sending at least a part of the subscriber data and the virtual Home Location Register identifier to a Home Location Register front end node; and
    a core network node configured to receive a reset message from the Home Location Register front end node in response to a data back end failure occurring in the data back end node or in connectivity to the back end node, the reset message including an indication of one of the virtual Home Location Register identifiers, whereby subscriber data corresponding to only a single data group identified by the virtual Home Location Register identifier is identified as needing to be reset by the core network node.

7. The data back end node according to claim 6, wherein the processor is arranged to assign a Home Location Register-No to each data group.

8. The data back end node according to claim 6, wherein each data group of the plurality of data groups is assigned a unique virtual Home Location Register identifier.

9. The data back end node according to claim 6, further comprising a second transmitter for sending at least a portion of the data stored in each data group to a further data back end node for back-up by the further data back end node.

* * * * *